Jan. 15, 1963  R. W. CARLSON ET AL  3,073,954
SHOCK RESISTANT SCINTILLATION METER COMPONENT
Filed June 23, 1959
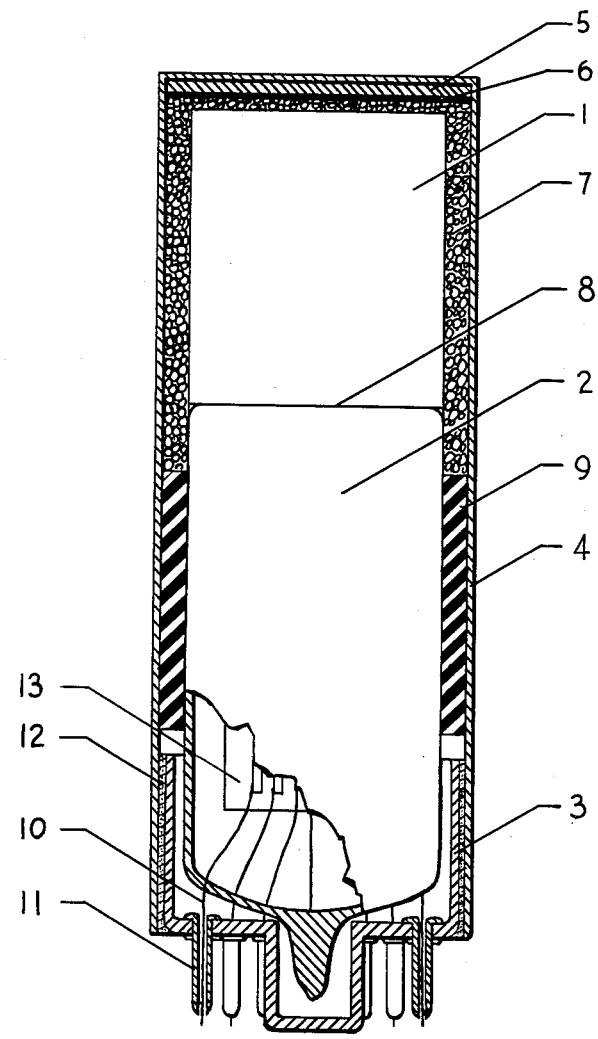
ROLAND W. CARLSON
RICHARD D. PLATT  INVENTORS.
BY
William H Brown
Atty.

United States Patent Office 3,073,954
Patented Jan. 15, 1963

3,073,954
SHOCK RESISTANT SCINTILLATION METER
COMPONENT
Roland W. Carlson, East Cleveland, and Richard D. Platt, Bay Village, Ohio, assignors to The Harshaw Chemical Company, Cleveland, Ohio, a corporation of Ohio
Filed June 23, 1959, Ser. No. 822,317
1 Claim. (Cl. 250—71.5)

The present invention relates to scintillation meter components and to methods of manufacture thereof.

Scintillation meter components are radiation detector components which function by means of converting radiation energy to light energy and thence to a measurable electric current. The scintillation meter components of the invention preferably consist of a luminophore, a photomultiplier tube and a suitable housing and contact carrying base for the luminophore-photomultiplier tube assembly.

Photomultiplier tubes are electric devices for converting light energy into electrical energy. Basically, a photomultiplier tube consists of a cylindrical glass envelope surrounding an electrode system called the dynodes. The top portion of the cylindrical glass envelope contains a light sensing device called the photo cathode. Light incident on the photo cathode causes it to emit photoelectrons, which are then focused and accelerated by the dynode system. The electronic impulse thus generated is carried to suitable recording devices or indicators by means of electrical contacts carried by said base and usually disposed on the cylindrical glass envelope at the end opposite the photo cathode.

Photomultiplier tubes which were formerly employed in scintillation meter components were of a type in which the electrical contact base was firmly anchored to the cylindrical glass envelope. Due to deformities in either the cylindrical glass envelope or the electrical contact base, the juncture of the glass envelope and the contact base usually resulted in the two components of the photomultiplier tube being in a slightly canted position in relation to each other. The canted position and the deformities or variations of the cylindrical glass envelope itself resulted in poor dimensional tolerances and difficult assembling when the photomultiplier tube was joined to the luminophore and the housing component. The assembled unit was also easily damaged due to the fragile juncture between the cylindrical tube envelope and the electrical contact base.

It is, therefore, an object of this invention to produce a scintillation meter component having a photomultiplier tube and wherein such tube does not require to be made to as strict dimensional tolerances.

It is another object of this invention to produce a shock resistant scintillation meter component.

It is still another object of this invention to provide a method for more easily assembling a scintillation meter component.

An improved scintillation meter component was achieved by the formation of an assembly wherein the phototube and the luminophore are both rigidly secured and optically coupled by using an epoxy resin. The assembly is then suitably placed in an aluminum container or housing which serves the two-fold purpose of hermetically sealing the luminophore and providing a light shield for the photomultiplier tube. The luminophore, which is surrounded by a suitable reflector medium, has been found to give better performance than other systems of the prior art. However, the dimensional tolerances and strength of this assembly can be no better than the dimensional tolerances and strength of the photomultiplier tube. The cylindrical glass envelope of the photomultiplier tube may vary as much as $\pm\frac{1}{4}''$ in height and as much as $\pm\frac{3}{32}''$ in diameter. The concentricity and angular deviation between the glass cylindrical tube and the base axis may vary considerably. This variation in tolerances requires an adjustment in equipment design so that excess room may be allowed to accommodate a unit of larger manufacturing tolerances even though space is at a premium. The space factor is extremely important when lead shielding is used around the scintillation meter component assembly. Increasing the inside diameter of the lead shield while keeping the radial thickness constant means an increased weight in the shield.

It has now been discovered that a shock resistant scintillation meter component of close dimensional tolerances may be produced by employing an assembly consisting of a luminophore rigidly optically coupled to the cylindrical glass envelope portion of a photomultiplier tube. The luminophore may be any of the luminophores commonly employed in the scintillation meter art, however the preferred luminophores are scintillation crystals and plastic phosphors. Plastic phosphors are solid solutions of fluorescent organic compounds in a suitable transparent material such as an organic polymeric resin. Where scintillation crystals are employed as the luminophore, the preferred crystal is a thallium activated sodium iodide scintillation crystal. The assembly may be placed in an aluminum housing which has a packed aluminum oxide or magnesium oxide coating and sealed at the desired depth by means of a flexible rubber potting seal. The luminophore-cylindrical glass envelope assembly is thus kept out of contact with the aluminum housing component, mechanical sealing of the luminophore with the housing component being unnecessary to maintain the position of the luminophore relative to the cylindrical glass envelope due to the use of an epoxy resin which effects a rigid seal as well as an optical seal between the luminophore and the cylindrical glass envelope tube. The result is that the luminophore and glass tube assembly are cushioned by the reflective packed coating and by the flexible rubber potting seal so as to be made shock-resistant and also that a constant outside diameter of the finished assembly may be maintained, as any variations in the tolerances of length and width of the cylindrical base envelope are taken up by the packed reflective coating and the flexible rubber potting seal.

The housing assembly is fitted with a photomultiplier tube wherein the cylindrical tube envelope is detached from the electrical contact base. Because of the use of a disassembled photomultiplier tube, it is possible to control the over-all height of the photomultiplier unit (tube and contact-carrying base) which was not possible when the tubes were supplied with a cylindrical glass envelope connected rigidly to the electrical contact base. By having the inside diameter of the aluminum housing closely fitted to the electrical contact base alone and not to the cylindrical tube envelope, all angular and concentricity deviations between the axis of the cylindrical tube envelope and said base are compensated for. The assembling operation consists of the following steps:

(a) A layer of cushioning material such as foamed resin, for instance, sponge rubber, is placed in the bottom of the aluminum housing.

(b) A polymeric resinous disc such as, for instance, a polyethylene disc is placed on top of the sponge rubber layer.

(c) Reflector material selected from the group consisting of powdered aluminum oxide and magnesium oxide is distributed over the polyethylene disc.

(d) The luminophore and phototube, which were previously optically coupled with the epoxy resin, are lowered into the assembly.

(e) The reflective coating material, preferably like that used in step (c) is packed around the sides of the luminophore and partially up the side of the cylindrical envelope of the photomultiplier tube.

(f) A flexible rubber potting material is poured around the cylindrical envelope and brought up to a level just below the electrical contact carrying base.

(g) The electrical contact carrying base is placed into the housing and sealed to the walls of the housing.

(h) The wires projecting from the cylindrical glass tube of the photomultiplier tube are dip soldered to the base pins of the electrical contact base of the photomultiplier tube.

Additional features and advantages of the invention will be apparent from the detailed description of the drawing which follows:

The FIGURE, which is not to scale, represents a central sectional view of the novel scintillation meter component having a broken-away portion.

Referring now to the drawing, a scintillation crystal 1 is rigidly secured to the cylindrical glass envelope 2 by means of an optical coupling 8. The scintillation crystal 1 and a portion of the cylindrical glass envelope 2 are loosely fitted into an aluminum housing component 4. A sponge rubber disc 5 is placed within the housing component 4 so as to be disposed between said housing component 4 and the scintillation crystal 1. A polyethylene disc 6 is interposed between the sponge rubber disc 5 and the crystal 1. The free area between the housing component 4, the scintillation crystal 1, and an adjacent portion of the cylindrical glass envelope 2 is packed with a suitable reflector material 7. The cylindrical glass envelope 2 is movably sealed to the walls of the aluminum housing component 4 by means of a flexible rubber seal potting material 9. An electrical contact base 3 is sealed to the walls of the aluminum housing component 4 by means of a suitable cement 12. The electrical contact base 3 is disposed out of contact with the cylindrical glass envelope 2. Electrical contact wires 10 (conductive and preferably flexible) extend through the hollow portion of the contacts 11 (conductive) of the electrical contact base 3 (non-conductive). The wires 10 are connected at one terminus to contacts 11 by means of a suitable soldering operation and are also joined to the dynode structure 13 at the other terminus. Electrical contact wires 10 (conductive and preferably flexible) are soldered to the contacts 11 (conductive) of the electrical contact base 3 (non-conductive).

In operation the scintillation meter component reacts to radiant energy in the same manner as the scintillation meter components of the prior art. Radiation from a source of radiant energy passes through the aluminum housing component 4, the sponge rubber disc 5, and polyethylene disc 6, and the reflective coating material 7 to the scintillation crystal 1, where the radiant energy is converted to light energy. The light energy will then pass through the cylindrical glass envelope 2 and impinge upon the photocathode where the light energy will be converted to an electrical impulse and amplified to a degree sufficient to be recorded on a suitable recording device. The radiant energy converted to light within the scintillation crystal may fail on its initial passage through the crystal to reach the cylindrical glass envelope 2 and may fall instead upon reflective coating 7, whereupon said light will be reflected and by traveling over a devious path, will eventually reach the cylindrical glass envelope 2.

The novel scintillation meter component of the invention has the advantage of being shock resistant. The scintillation crystal 1 and the cylindrical glass envelope 2 may be considered a free floating assembly although the possible extent of its motion relative to the housing is small. The scintillation crystal 1 and the cylindrical glass envelope 2 are completely out of contact with the aluminum housing component 4. As a result any shock encountered by the housing component 4 is cushioned by the potting material 9, the reflective coating material 7, the sponge rubber disc 5, and the polyethylene disc 6 or one or more thereof. The shock resistant arrangement is made possible by the disposition of the electrical contact base 3 out of contact with the cylindrical glass envelope 2 and by the use of an optical coupling coating 8, which will rigidly secure the cylindrical glass envelope 2 to the crystal 1. The rigid coupling of the scintillation crystal 1 to the cylindrical glass envelope tube 2 permits the scintillation crystal 1 to float within the aluminum housing component 4 rather than being mechanically coupled to the housing component so as to maintain a stable position with relation to the photomultiplier tube. The disposition of the electrical contact base 3 out of contact with the cylindrical glass envelope 2 permits the cylindrical glass envelope tube 2 to float within the confines determined by the flexible rubber potting seal 9 rather than being mechanically coupled to the aluminum housing component 4 through a rigid mechanical coupling with the electrical contact base 3.

The novel scintillation meter component of the invention also has the advantage of having close dimensional tolerances without requiring strict tolerances in the manufacture of the glass envelope 2. The cylindrical glass envelope 2 may be aligned by means of the flexible rubber potting seal 9, in the housing component 4 without making adjustments for either variations in its length or diameter, or for the degree of cant which formerly existed at the juncture of the cylindrical glass envelope and an electrical contact base. As the cylindrical glass envelope 2 floats within the aluminum housing component 4, the criticality of diameter tolerances of the glass envelope is eliminated. Any variation in the length of the glass envelope will be compensated for in length of electrical wire (preferably but not necessarily easily flexible) necessary to contact the detached electrical contact base 3 with the electrical wires 10, which lead from elements within the glass envelope 2. The variations due to a canted position of the electrical contact base 3 with the electrical wires of the glass envelope 2 have been eliminated by mechanically coupling the electrical contact base 3 to the walls of the aluminum housing component 4 out of contact with the glass envelope 2. It may, therefore, be seen that the outer dimensions of the scintillation meter component of this invention may be made to more exacting tolerances on account of the design disclosed herein and without making the dimension tolerances of the tube and crystal more strict.

Having thus described our invention, what we claim is:

A scintillation meter component comprising:

(a) a luminophore, (b) a photomultiplier tube optically coupled to said luminophore, (c) a housing element containing said luminophore and said photomultiplier tube, (d) highly diffuse reflective material filling the space between said housing element and said luminophore and between said housing element and said photomultiplier tube through a portion of its length adjacent said luminophore, (e) shock resistant sealing material in the space between said housing element and a portion of said photomultiplier tube, said sealing material and said diffuse-reflective material serving together to fix said luminophore and said photomultiplier tube with respect to said housing element, and (f) an electrical contact-carrying base sealed to said housing element out of contact with the glass portion of said photomultiplier tube.

(References on following page)

References Cited in the file of this patent

UNITED STATES PATENTS

| | | | |
|---|---|---|---|
| 683,766 | Cunningham | July 13, | 1954 |
| 2,686,268 | Martin et al. | Aug. 10, | 1954 |
| 2,789,242 | Friedman et al. | Apr. 16, | 1957 |
| 2,799,780 | Ruderman | July 16, | 1957 |
| 2,806,279 | Anderson | Sept. 17, | 1957 |
| 2,853,620 | Fox et al. | Sept. 23, | 1958 |
| 2,879,583 | Booth et al. | Mar. 31, | 1959 |

OTHER REFERENCES

Applications of Some Epoxy Resins in the Plastic Industry, by Narracott, British Plastics, October 1951, pages 341–345.

UNITED STATES PATENT OFFICE
CERTIFICATE OF CORRECTION

Patent No. 3,073,954  January 15, 1963

Roland W. Carlson et al.

It is hereby certified that error appears in the above numbered patent requiring correction and that the said Letters Patent should read as corrected below.

Column 5, line 3, for

"683,766   Cunningham ----   July 13, 1954"

read

-- 2,683,766   Cunningham ----   July 13, 1954 --.

Signed and sealed this 2nd day of July 1963.

(SEAL)
Attest:

ERNEST W. SWIDER
Attesting Officer

DAVID L. LADD
Commissioner of Patents